United States Patent
Furuhashi et al.

(10) Patent No.: US 8,488,180 B2
(45) Date of Patent: Jul. 16, 2013

(54) PRINTER AND PRINTING METHOD THAT PREVENTS INTERMIXING OF DIFFERENT IMAGE DATA ON RECORDING MEDIUM

(75) Inventors: Ryusuke Furuhashi, Kanagawa (JP); Masanori Takamatsu, Kanagawa (JP); Hiroshi Dohi, Tokyo (JP); Hideki Matsuzaka, Kanagawa (JP); Hiroyuki Ushifusa, Tokyo (JP); Hideyuki Shoji, Kanagawa (JP); Tsukasa Ishii, Tokyo (JP); Minoru Sato, Tokyo (JP); Chieko Aizawa, Tokyo (JP)

(73) Assignees: Sony Corporation, Tokyo (JP); Olympus Medical Systems Corp., Tokyo (JP)

( * ) Notice: Subject to any disclaimer, the term of this patent is extended or adjusted under 35 U.S.C. 154(b) by 1140 days.

(21) Appl. No.: 11/566,910

(22) Filed: Dec. 5, 2006

(65) Prior Publication Data

US 2008/0174820 A1    Jul. 24, 2008

(30) Foreign Application Priority Data

Dec. 6, 2005  (JP) ................ P2005-352483

(51) Int. Cl.
    *G06F 15/00* (2006.01)
(52) U.S. Cl.
    USPC ....... 358/1.18; 358/1.14; 358/1.15; 358/1.16; 348/207.2; 382/128
(58) Field of Classification Search
    USPC ............... 348/207.2; 358/1.14, 1.15, 1.16, 358/1.18; 382/128
    See application file for complete search history.

(56) References Cited

U.S. PATENT DOCUMENTS

| | | | | |
|---|---|---|---|---|
| 4,949,190 A | * | 8/1990 | Thompson | 358/1.17 |
| 5,615,315 A | * | 3/1997 | Nakajima | 358/1.16 |
| 5,874,937 A | * | 2/1999 | Kesatoshi | 345/428 |
| 6,188,787 B1 | * | 2/2001 | Ohmae et al. | 382/165 |
| 6,552,743 B1 | * | 4/2003 | Rissman | 348/207.2 |
| RE38,759 E | * | 7/2005 | Suzuki | 348/220.1 |
| 7,821,657 B2 | * | 10/2010 | Ferlitsch | 358/1.13 |
| 2002/0044301 A1 | * | 4/2002 | Kitazawa | 358/1.16 |

FOREIGN PATENT DOCUMENTS

| | | |
|---|---|---|
| JP | 03-155969 | 7/1991 |
| JP | 07-131745 | 5/1995 |
| JP | 10-029358 | 2/1998 |
| JP | 10-211740 | 8/1998 |
| JP | 2001-094719 | 4/2001 |
| JP | 2003-080791 | 3/2003 |
| JP | 2003-216372 | 7/2003 |
| JP | 2004-236109 | 8/2004 |
| JP | 2005-013409 | 1/2005 |

* cited by examiner

Primary Examiner — Peter K Huntsinger
(74) Attorney, Agent, or Firm — Dentons US LLP

(57) ABSTRACT

A mixture of image data in a plurality of categories is prevented from being present on one sheet of recording paper and the handling of printed recording paper is facilitated. Inputted captured image data is saved in order in an image memory. Kinds of the inputted captured image data are determined by the determination section. When the captured image data inputted to the determination section is determined to be of a different kind from the previously inputted image data, the determination section prints through a print head the captured image data previous to the captured image data determined to be of a different kind by the determination section.

14 Claims, 6 Drawing Sheets

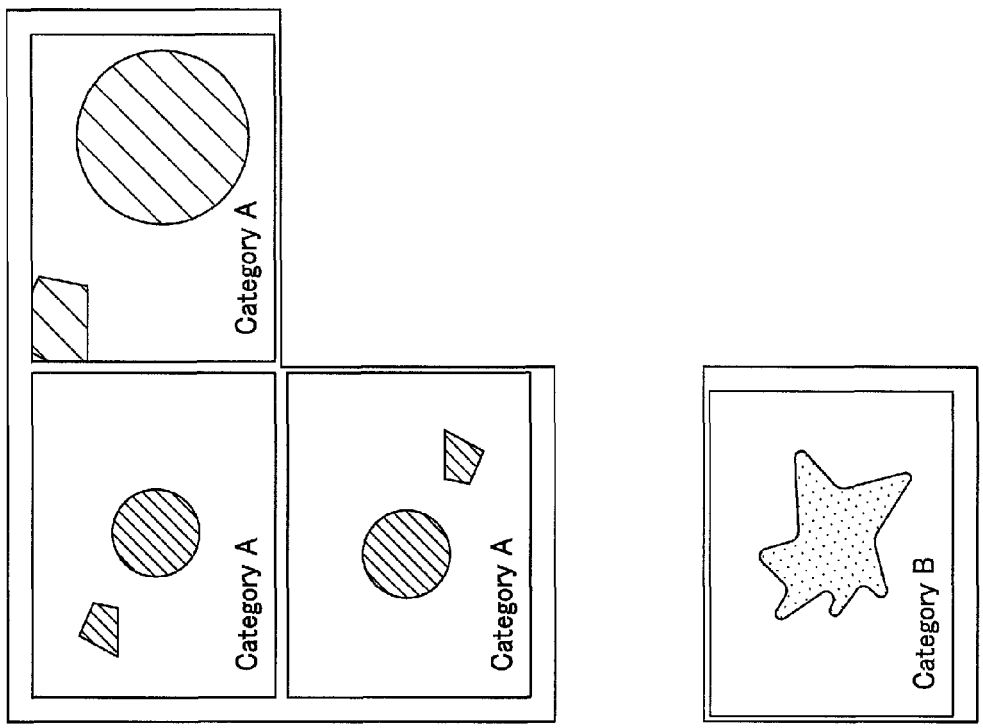
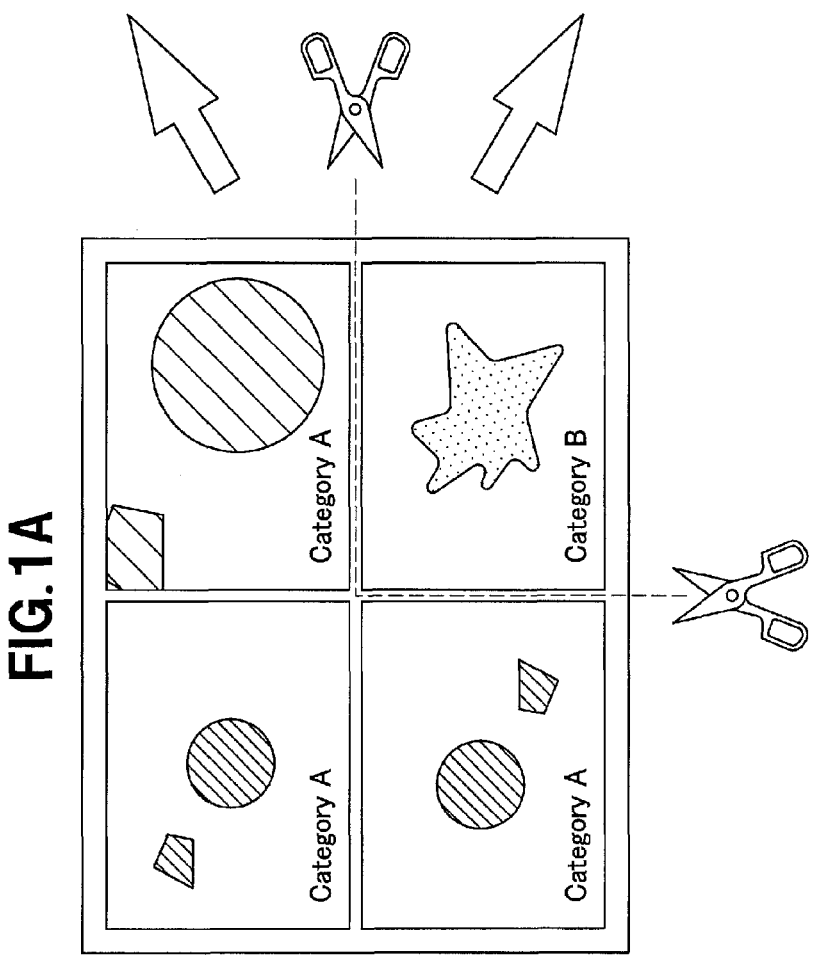

PRINTER AND PRINTING METHOD THAT PREVENTS INTERMIXING OF DIFFERENT IMAGE DATA ON RECORDING MEDIUM

CROSS REFERENCES TO RELATED APPLICATIONS

The present invention contains subject matter related to Japanese Patent Application JP 2005-352483 filed in the Japanese Patent Office on Dec. 6, 2005, the entire contents of which being incorporated herein by reference.

BACKGROUND OF THE INVENTION

1. Field of the Invention

The present invention relates to a printer connected to a video apparatus such as a video camera and a television set to print an image and a printing method using the same.

2. Description of the Related Art

Recent years have seen video printers storing one frame or one field constituting image signals, which are picked up by a video apparatus such as a video camera in an image memory, and printing image data saved in the image memory. This video printer is connected not only to the above-mentioned video camera but also to an ultrasonic image-pickup device, an MRI, an electronic microscope, an endoscope and the like and is used in a wide range of fields, such as medical facilities, research laboratories, and schools.

In such video printer, image signals from various video apparatuses connected to an input terminal are taken in at a desired timing and stored in the image memory. Then, printing of one image or a plurality of images on a sheet of recording paper can be immediately done by pressing a print button after selecting a print direction, print mode and the like. With such availability, it is general practice that a plurality of kinds of vide apparatuses are connected via a selector to one video printer or a plurality of users share and use one video printer.

SUMMARY OF THE INVENTION

However, the video printer in the past merely prints the image data stored in the image memory sequentially by a pressing operation to print buttons. Accordingly, as shown in FIG. 1A, when a setting was for a plurality of images to be printed on one recording paper, there may occur inconvenience of printing images of different categories printed on one recording paper. In the event that an image of different category is printed on one recording paper, as shown in FIG. 1B and FIG. 1C, it is necessary to cut off and separate an image part having a different category and carefully edit for file management.

Nonetheless, a recording paper with a part thereof cut out as shown in FIG. 1B and a separated recording paper as shown in FIG. 1C are hard to handle and lack of uniformity in appearance. Especially, unlike the personal use, when using the video printer in the above-mentioned businesses etc., there are many operational concerns calling for means of resolution at an early date.

Note that as a technique of control and classification in a case where prints of various categories are mixed and ejected as a result of sharing one printer with a plurality of users and apparatuses, the following Patent Documents are available: Patent Document 1: Jpn. Pat. Appln. Laid-Open Publication No. 2003-80791, Patent Document 2: Jpn. Pat. Appln. Laid-Open Publication No. 10-211740 and Patent Document 3: Jpn. Pat. Appln. Laid-Open Publication No. 10-29358. However, what is disclosed in these Documents is designed for the user to easily recognize output results. Control of printing matter is not taken into consideration yet.

The present invention has been made in view of the above. It is desirable to provide a printer and printing method which prevent image data of a plurality of categories from being mixed on one recording paper and facilitate handling of the printed recording paper.

According to the present invention, it is desirable to provide a printer and printing method which can prevent the same image from being repeatedly printed by mistake.

Further, according to the present invention, it is desirable to provide a printer and printing method which enable the user to easily grasp an operating status of the printer visibly by concurrently turning off the display upon printing.

According to an embodiment of the present invention, there is provided a printer for printing image data inputted from a video apparatus, including: an image memory that saves inputted image data in order; printing means for printing the image data saved in the image memory; determination means for determining a kind of the inputted image data; and control means for controlling the image data saved in the image memory to be printed by the printing means according to a result of determining the image data by the determination means. If the determination means determines that the inputted image data is of a different kind from the previously inputted image data, the control means controls the image date previous to the image data whose kind is determined to be different by the determination means to be printed by the printing means.

A printing method according to an embodiment of the present invention is designed such that an image of a different kind can be printed on another recording paper by using the printer.

According to an embodiment of the present invention, there is also provided a printer for printing image data inputted from a video apparatus, including: an image memory that saves the inputted image data in order; printing means for printing the image data saved in the image memory; determination means for determining the inputted image data; and control means for controlling the image data saved in the image memory to be printed by the printing means according to a result of determining the image data by the determination means. If the determination means determines that the inputted image data is different from the previously inputted image data, the control means controls the image data previous to the image data which is determined to be different by the determination means to be printed by the printing means.

A printing method according to an embodiment of the present invention is designed to print a different image on another recording paper by using the printer.

According to the present invention, when the determination means determines a kind of image data or the image data inputted is different from the kind of image data or the image data previously inputted, the image data previous to the image data determined to be different by the determination means is arranged to be printed by the printing means. Therefore, the image data of a plurality of categories are prevented from being mixedly printed on a sheet of recording paper, thereby making it easy to handle printed recording papers.

BRIEF DESCRIPTION OF THE DRAWINGS

FIGS. 1A to 1C are diagrams showing examples of printing in the past;

DETAILED DESCRIPTION OF THE PREFERRED EMBODIMENTS

Figure 2:
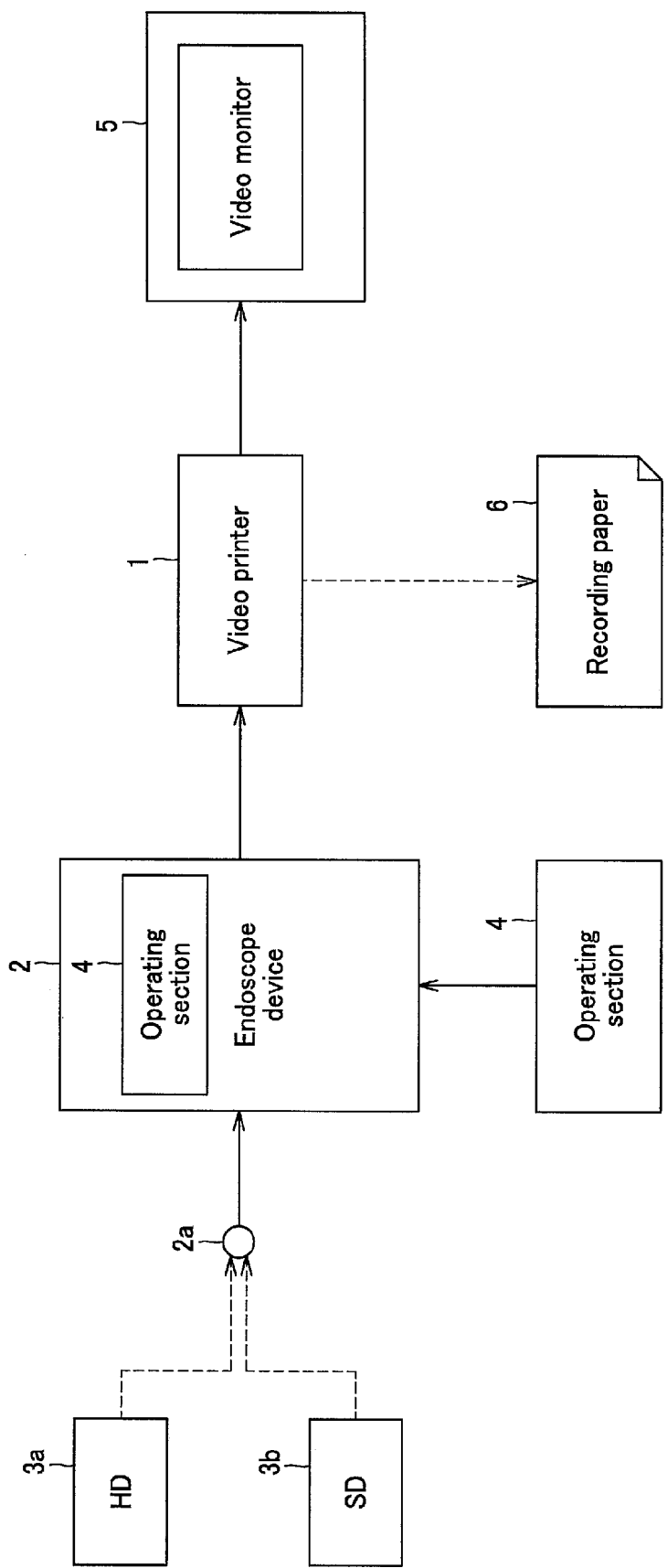
FIG. 2 is a diagram explaining a usage example of a video printer according to the embodiment of the present invention.

Referring now to the drawings, the following describes a video printer to which an embodiment of the present invention has been applied.

As shown in FIG. 2, the video printer 1 according to the embodiment of the present invention is used in medical care facilities. To an input side of the video printer 1, an endoscope device 2 is connected as a video apparatus and to an output side thereof, a video monitor 5 constituted by a CRT (Cathode Ray Tube) or an LCD (Liquid Crystal Display) is connected. The video printer 1 prints captured image data inputted from the endoscope device 2 on a recording paper.

The endoscope device 2 has an input terminal 2a and is connected to either a first endoscope probe 3a equipped with an HD (High Definition) camera or a second endoscope probe 3b equipped with an SD (Standard Definition) camera. When using either of the first endoscope probe 3a or the second endoscope probe 3b, the endoscope device 2 outputs image data picked up by the endoscope probe being used to the video printer 1. When a capture button constituting an operating section 4 is pressed, the endoscope device 2 outputs one frame or one field of the captured image data at a timing with which the captured button is pressed, to the video printer 1 so as to be displayed on a video monitor 5.

Namely, when either of the first endoscope probe 3a or the second endoscope probe 3b is used, the endoscope 2 outputs to the video printer 1a video or captured image data of SD type or HD type including a synchronous signal to display on the video monitor 5 connected to the output terminal of the video printer 1. The video printer 1 prints the image or the captured image data of the SD type or the HD type inputted from the endoscope 2 on a recording paper 6. At the same time, the video printer 1 outputs image data for monitor to the video monitor 5 and displays the image data or the captured image data from the endoscope 2 on a display screen.

Note that, the video monitor 5 may be an integral type built in the video printer 1 or may be an external to the video printer 1.

Figure 3:
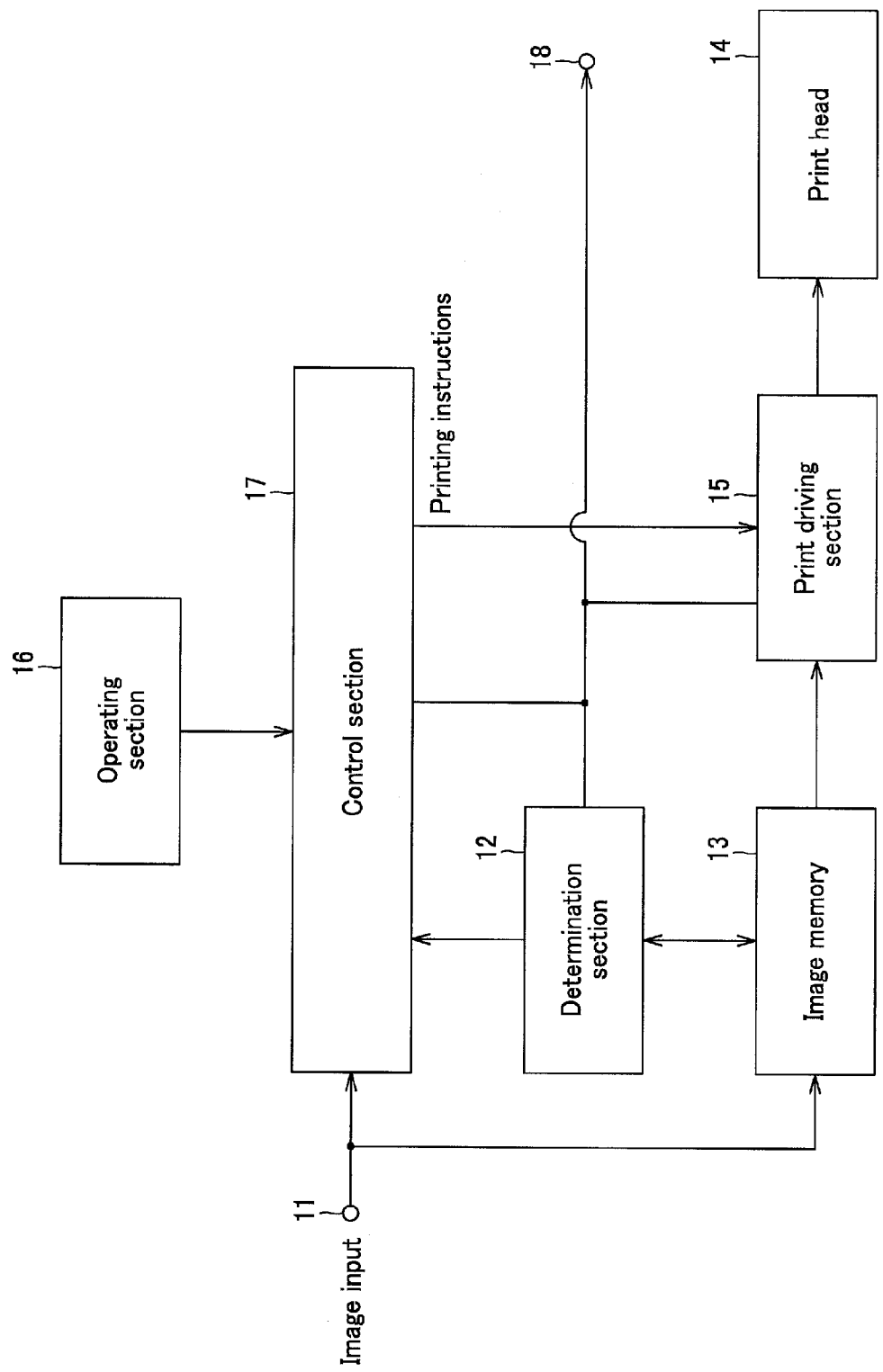
FIG. 3 is a block diagram of a video printer according to the embodiment of the present invention.

Specifically, as shown in FIG. 3, the video printer 1 according to the embodiment of the present invention includes a determination section 12 to which the captured image data from the input terminal 11 connected to the endoscope device 2, an image memory 13 which saves the captured image data inputted from the input terminal 11, a print head 14 which prints image data saved in the image memory 13, a printing drive section 15 which controls drive of a print head 14, an operating section 16 which generates an operating signal by the user, and a control section 17 which controls the entire operation. The video printer 1 also includes an output terminal 18 which outputs to the video monitor 5 image data picked up by the first endoscope probe 3a and the second endoscope probe 3b and inputted from the input terminal 11.

The determination section 12 determines a kind of the captured image data inputted from the endoscope device 2 through the input terminal 11 for video. Specifically, as mentioned above, either of the first endoscope probe 3a of the HD type or the second endoscope probe 3b of the SD type is connected to the endoscope 2. Hence, the captured image data of the SD type or the HD type including vertical and horizontal synchronous signals to be displayed on the video monitor 5 is inputted from the endoscope 2 to the input terminal 11.

A difference between the SD type and the HD type will be described here. The HD type has a shorter period of synchronous signals than the SD type because of realizing high resolution. The determination section 12 detects the kind of image data inputted from the endoscope device 2 by detecting the difference of the period of the synchronous signals between the SD type and the HD type.

In the image memory 13, the captured image data inputted from the input terminal 11 is saved in order of time. Note that the order to be saved in the image memory 13 may be in the order of operation, that is, in the order of being captured. The image data saved in the image memory 13 is erased by the user's operation or upon completion of printing.

A thermal head is used for the print head 14 to realize high quality of printing. The recording paper 6 to be used for printing is a recording paper with a recording layer provided on a sheet of base material such as a resin. By applying thermal energy corresponding to the image data to be printed by the thermal head on the recording layer, a desired image is transferred.

Note that when using the thermal head for the print head 14, the image may be formed through a thermal transfer of coloring materials such as an ink ribbon dye to an ordinary paper. Further, in addition to the thermal head, as the print head 14, there may be used a print head for inkjet which ejects an ink from a nozzle by generating pressure inside a liquid chamber.

The printing drive section 15 controls drive of the print head 14, while generating printing data. Specifically, the printing drive section 15 reads out the image data for printing from the image memory 13 and generates printing data. For example, there is generated four-part split printing data which enables the captured image data selected for printing to print a maximum of four kinds of image data on one sheet of recording paper 6. Further, when the determination section 12 determines that the kind of image data inputted from the input terminal 11 is different, the printing drive section 15 uses the image data before the determination section 12 determines that the kind is different, and the section 15 generates the printing data conforming to the above-mentioned four-part split printing data at the maximum. Note that the number of images printed on one sheet of recording paper 6 is not limited to four.

The operating section 16 is made up of a touch panel provided on the main body of the video printer 1 and a plurality of push buttons. The operating section 16 includes a print start button, a capture button to capture an image being picked up by either of the first endoscope probe 3a of the endoscope device 2 or the second endoscope probe 3b of the endoscope device 2, and a mode change-over button to change over a mode that causes image signals from the endoscope device 2 to be displayed on the video monitor 5 and a mode that causes printing data to be displayed on the video monitor 5. The operating section 16 constituted by such operating buttons, when operated by the user, generates operating signals corresponding to the kind and inputs to the control section 17.

The control section 17 controls the entire apparatus according to the operating signal inputted from the operating section 16. For example, when a mode to display image data from the endoscope device 2 on the video monitor 5 is selected by the mode changeover button, the image data from the endoscope device 2 is directly outputted from the output terminal 18 to the video monitor 5. Further, when a mode to display the captured image data is selected by the mode change-over button, the control section 17 reads out the captured image data saved in the image memory 23, generates complex image data including vertical and horizontal synchronous signals necessary for carrying out display of the SD type or the HD type on the video monitor 5, that is, the image data including synchronous signals for monitor display and outputs to the video monitor 5 so as to confirm the image data for printing. At this time, the control section 17 makes arrangements for the captured image data determined by the determination section 12 to be of the same kind so that the captured image data can be set to a size allowing four-part split to be displayed on one screen of the video monitor 5 in terms of the SD type and the HD type respectively. Namely, arrangements are made to ensure that the captured image data of different kinds are not displayed on the same screen.

Figure 4:
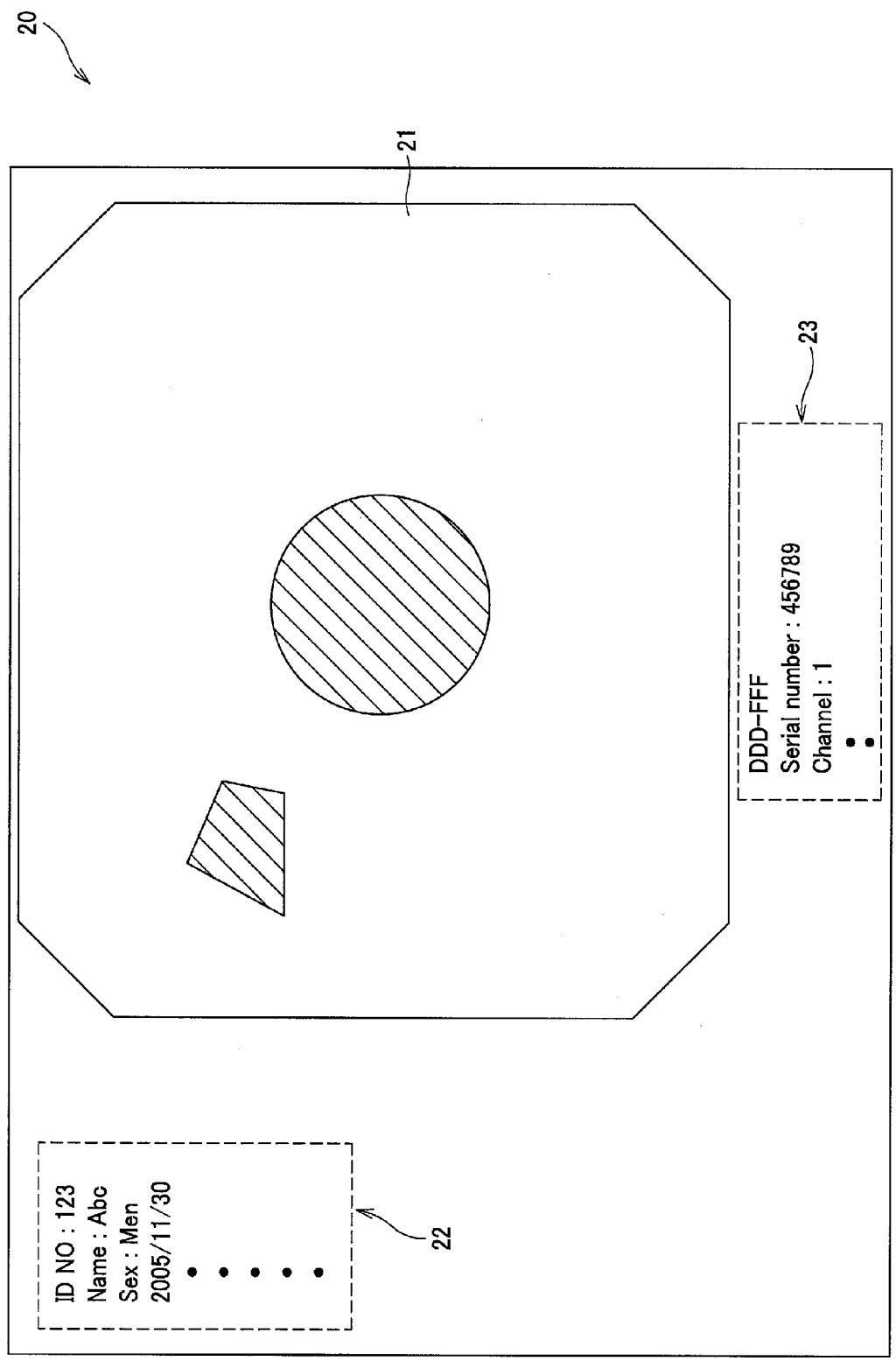
FIG. 4 is a diagram showing captured image data inputted from an endoscope device.

When either of the capture button of the endoscope device 2 or the capture button of the video printer 1 is pressed, the captured image data inputted from the input terminal 11 to the video printer 1 will be described referring to FIG. 4. As shown in FIG. 4, this captured imaged data 20 is composed of a captured image part 21 picked up by either of the first endoscope probe 3a or the second endoscope probe 3b, a patient identification part 22 made up of patient's identification data, such as the ID number, name, sex, age, remark of a patient of the captured image part 21, and a status identification part 23 made up of various status data for identifying an endoscope probe used for shooting. The endoscope 2 outputs the captured image data as shown in FIG. 4 with respect to the input terminal 11 of the video printer 1. The control section 17 of the video printer 1 saves the captured image data in the order of being inputted to the input terminal 11, that is, in order of time.

Figure 5:
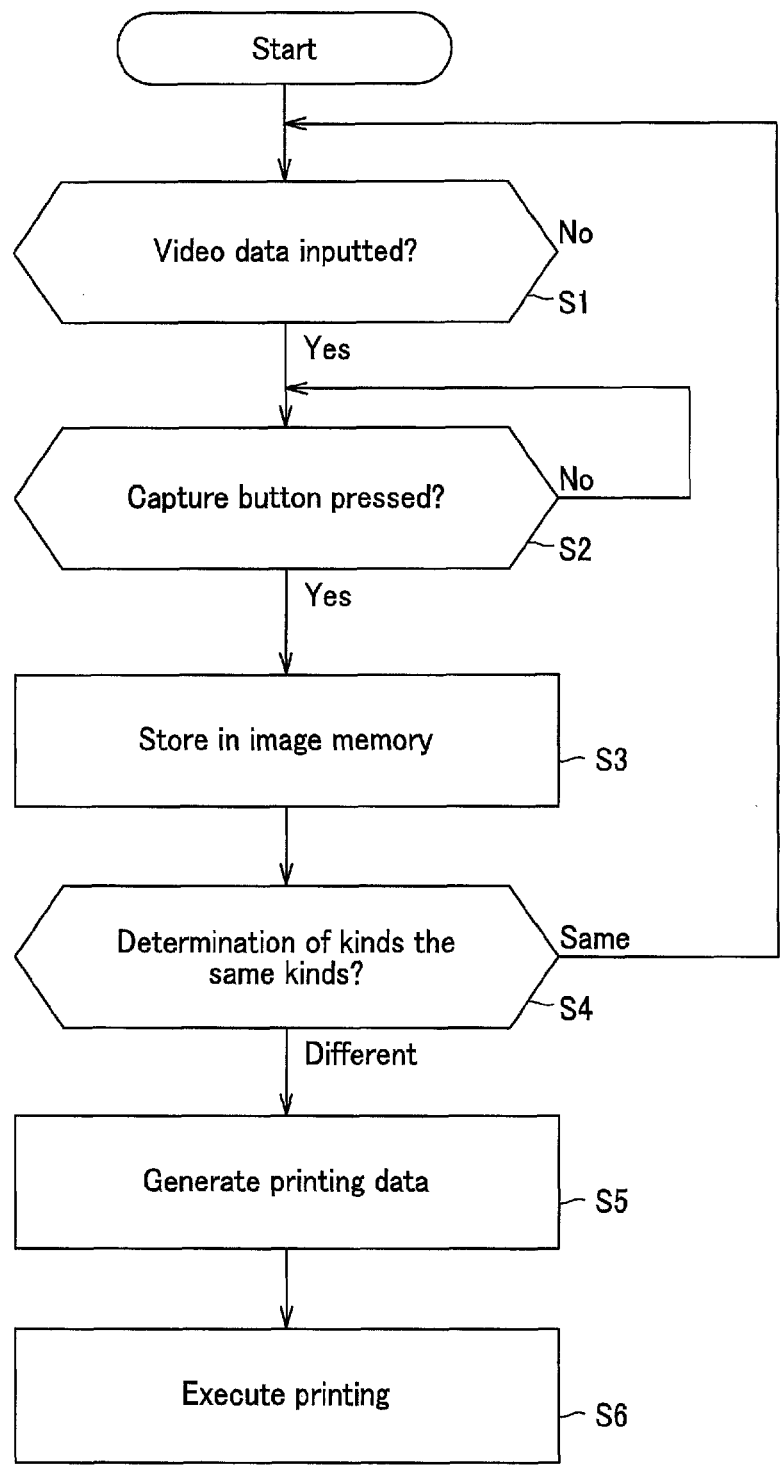
FIG. 5 is a flowchart explaining operation of the video printer according to the embodiment of the present invention.

Next, operation when the capture button of the video printer 1 or of the endoscope device 2 of the above-described configuration is pressed will be described referring to FIG. 5.

The control section 17 of the video printer 1 determines in step S1 whether or not image data is inputted from the endoscope device 2 to the input terminal 11. If there is no input of the image data, step S1 is repeated, and if there is an input of the image data, the control section 17 moves to step S2.

In step S2, the control section 17 determines whether the capture button constituting the operation section 4 of the endoscope device 2 or the capture button constituting the operating section 16 of the video printer 1 is pressed. Then, when the capture button is pressed, the control section 17 moves to step S3, and when the capture button is not pressed, step S2 is repeated. When the capture button is pressed, the control section 17 saves in the image memory 13 the captured image data inputted from the endoscope device 2 at the time when the capture button is pressed, as shown in FIG. 4. At the same time, the control section 17 outputs the captured image data saved in the image memory 13 to the output terminal 18, so that the captured image data can be confirmed through the video monitor 5.

In step S4, the control section 17 determines the kind of image data saved in the image memory 13. Specifically, determination is made by detecting the period of synchronous signal as to whether the image data inputted to the input terminal 11 is the image data of the HD type inputted from the first endoscope probe 3a or the image data of the SD type inputted from the second endoscope probe 3b. Further, the control section 17 returns to step S1 when the period is the same as the period of the synchronous signal of the previously inputted captured image data. Furthermore, the control section 17 moves to step S5 when the period of the synchronous signal is different from the synchronous signal of the previously inputted captured image data and enters into printing preparation of the captured image data whose synchronous signal is the same.

At this time, to prevent user's confusion, the control section 17 may prohibit further to take in the captured image data, that is, prohibit to input the captured image data from the endoscope device 2.

Further, during the same time the captured image data is sequentially inputted to the input terminal 11, the control section 17 displays the captured image data read out from the image memory 13 on the video monitor 5, for example, a maximum of four pieces of images on one screen When the synchronous signal is different from the previously inputted captured image data, in step S5, the control section 17 reads out from the image memory 13 the captured image data for printing having the same synchronous signal, that is, the captured image data before the captured image data having the different synchronous signal is inputted, and outputs the captured image data to the printing drive section 15. Then, the printing drive section 15 generates printing data based on the inputted captured image data. For example, the printing drive section 15 generates printing data that can print four pieces of images on one recording paper 6. Further, when the images to be printed exceed four pieces, the printing drive section 15 generates printing data for a second sheet, further a third sheet of the recording paper 6. Furthermore, the control section 17 generates complex image data including the vertical and horizontal synchronous signals and displays such data on the video monitor 5.

In step S6, the control section 17 drives the print head 14 according to the print data generated in the printing drive section 15. In this manner, the captured image data having the same synchronous signal is printed on the recording paper 6. Note that the control section 17 may erase display of the captured image data which has the same printing data that was printed and is being displayed on the video monitor 5, so that the user can recognize completion of the printing.

Further, upon completion of printing, the control section 17 may erase the captured image data whose printing was completed to prevent the image data whose printing was completed from being repeatedly printed by mistake.

Figure 6:
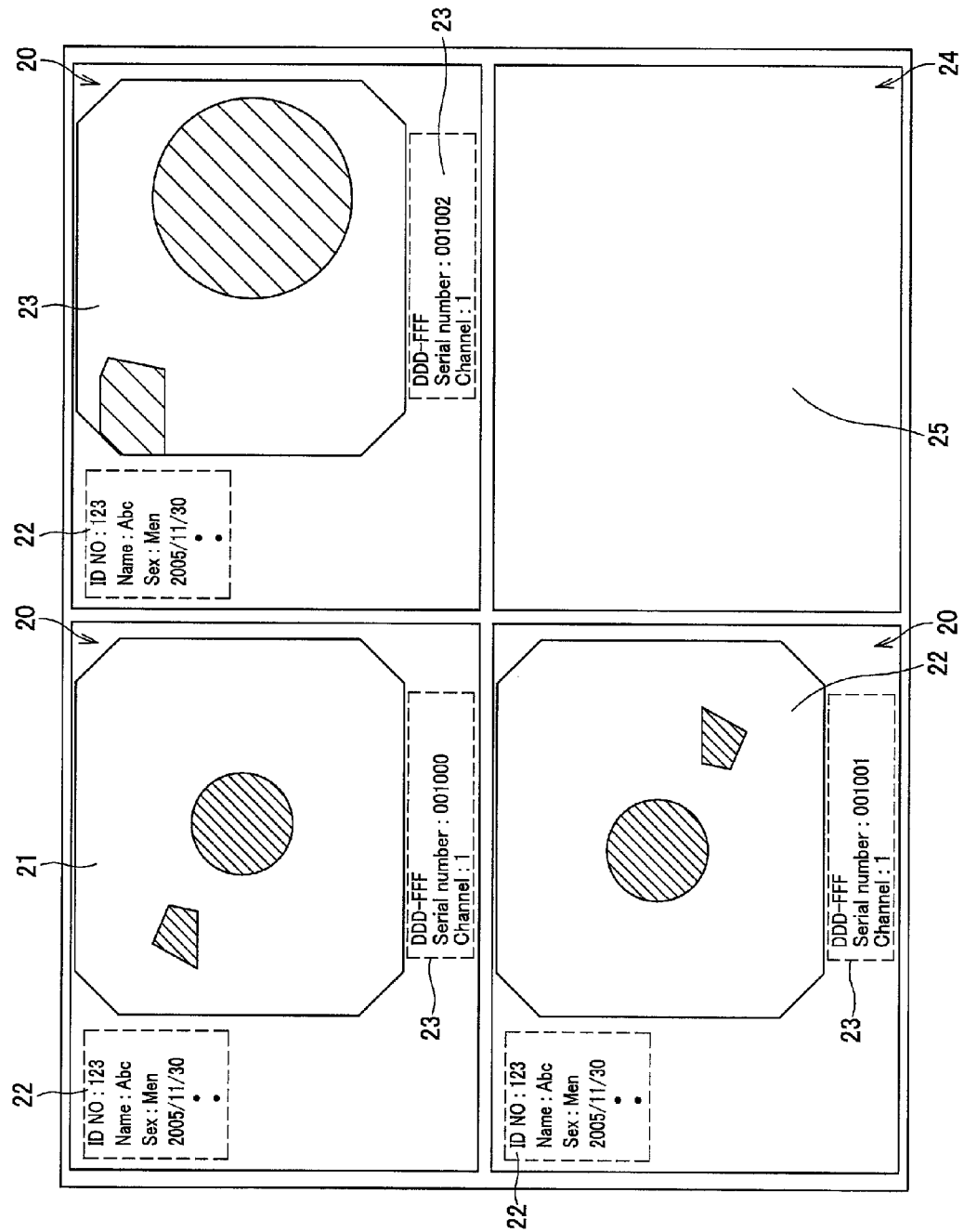
FIG. 6 is a diagram showing a state of a recording paper being printed.

Now, the state of the recording paper 6 printed according to the above-mentioned procedures will be described. As shown in FIG. 6, for example, one sheet of recording paper is arranged to put for four pieces of images. The image to be printed, that is, suppose there are three pieces of captured images which were determined to have the same synchronous signal, a space on the lower right in the drawing becomes a blank region 25. This allows only the captured image of the same kind to be printed.

According to the video printer 1 mentioned above, when the kind of captured image data to be inputted to the input terminal 11 is different, arrangements are made for the captured image data up to that point is printed. Consequently, a mixture of a plurality of kinds of image data to be present on one recording paper can be prevented.

Further, determination of the kind of image data is made by using part of the signals of the complex image data. For example, the determination is not the kind that is made by using other control data than the image signals. Namely, this determination uses a signal line for image data and is not carried out by using the identification data exchanged through the signal line for control. Consequently, even if the control line between the endoscope device 2 and the video printer 1 is detached, the video printer 1 carries out determination of the kind of image data with certainty and can automatically print when the kind of image data is different.

Hence, when the kind of synchronous signal of the image data inputted from the endoscope device 2 is replaced, it can be considered that the patient is different. In the video printer 1 according to the embodiment of the present invention, when the synchronous signal of the inputted captured image data is different, the captured image data, that is, the captured image data having the same synchronous signal is designed to be automatically printed. Consequently, a case where the captured image data of a plurality of patients are printed on one recording sheet can be prevented to enable the user to control printed matter without trouble. Further, even if the control line between the video printer 1 and the endoscope device 2 is detached, the captured image data up to that point, that is, the captured image data having the same synchronous signal, can be automatically printed.

In the above, a case where the kind of image data is determined by using the synchronous signal has been described, but in determining the kind, the present invention is not limited to this. For example, when the first endoscope probe 3a is based on the color system, while the second endoscope probe 3b is based on the black and white system, the determination section 12 may determine that the captured image data inputted is in color or in black and white, when a change is made from color to black and white or from black and white to color, the previous data may be printed. Namely, according to the embodiment of the present invention, determination of the type may be made by using part of the image data.

Further, in the above-mentioned example, the kind of the captured image data inputted to the input terminal 11 is determined by the synchronous signal accompanying the image data. However, according to the embodiment of the present invention, the kind of the captured image data may be determined based on the image pattern for identification contained in the captured image data itself.

Namely, when changing over the first endoscope probe 3a and the second endoscope probe 3b, input from the first endoscope probe 3a or the second endoscope probe 3b is interrupted so that the whole in the same color, for example, the entire dummy image data in black or white is inputted to the video printer 1. The dummy data is used herein as the image pattern for identification. In this case, in step S4, the control section 17 determines whether the image data inputted from the endoscope 2 is the image pattern for identification or not. If the image pattern for identification is detected, the captured image data thus far saved in the image memory 13 may be printed.

Moreover, as the image pattern for identification, in addition to the dummy image data, part of the inputted image data may be used as the image pattern for identification. For example, depending on a shooting location, e.g., inside the stomach or inside the large intestine, RGB data of the image data varies. Accordingly, a characteristic part of the RGB data may be used as the image pattern for identification, when the characteristic part of the RGB data changes, the previous captured image data saved in the image memory 13 may be printed.

In the foregoing, examples in which the endoscope device 2 is used for an input side video apparatus were described. As the endoscope probes 3a and 3b used for this endoscope device 2, a rigid endoscope and flexible endoscope can be applied. Further, a video apparatus connected to the video printer 1, when assuming a medical scene, may be an ultrasonic image-pickup device, an MRI, or an electron microscope in addition to the endoscope device 2. Still further, to the video printer 1, a different kind of video apparatus for medical use may be connected. Furthermore, as the video apparatus connected to the video printer 1, a digital or analog video camera, or a video cassette recorder is acceptable. Moreover, the number of video apparatuses to be connected to the video printer 1 is not particularly limited.

It should be understood by those skilled in the art that various modifications, combinations, sub-combinations and alterations may occur depending on design requirements and other factors insofar as they are within the scope of the appended claims or the equivalents thereof.

What is claimed is:

1. A printer, comprising:
    an image memory in which different kinds of image data can be stored, the image data corresponding to different patients and being stored with reference to the order in which the image data are stored in the image memory;
    a printing unit that prints images based on the image data stored in the image memory;
    a controller that manages the image data stored in the image memory and controls the printing unit; and
    a determination configuration that determines that a patient is different from another patient by detecting a period of signal information in the image data,
    wherein,
        when the determination configuration determines that a kind of the image data presented for storage in the image memory is different than that of a last stored image data, the controller causes the printing unit to print all images for the last stored image data and all precedingly stored image data of a same kind as the last stored image data so as to prevent captured images of a plurality of the patients to be printed on one recording sheet, and
        when the determination configuration determines that the kind of the image data presented for storage in the image memory is not different than that of the last stored image data, the controller causes the image data presented for storage to be stored in the image memory.

2. The printer of claim 1, further comprising a video signal input, wherein the determination configuration determines the kind of the image data presented for storage in the image memory based on the period of the signal information comprising a synchronous signal of a video signal associated with the image data presented for storage.

3. The printer of claim 1, wherein, upon completion of printing of the images, the controller clears from the image memory the image data for the printed images.

4. The printer of claim 1, further comprising a display device with a display screen on which the controller causes the printed images to be displayed.

5. The printer of claim 4, wherein, upon completion of printing of the images, the controller causes the display screen to be cleared of the printed images.

6. The printer of claim 1, wherein the kind of the image data means source of the image data, and the determination configuration determines the source of the image data presented for storage.

7. The printer of claim 1, wherein, when the determination configuration determines that the kind of the image data presented for storage in the image memory is not different than that of the last stored image data, and that the storage of the image data presented for storage will exceed a predetermined number of associated images, the controller (a) causes the printing unit to print all images for the last stored image data and all precedingly and successively stored image data of the same kind as the last stored image data on a sheet of recording paper, (b) clears from the image memory the image data for the printed images, and (c) causes the storage of the image data presented for storage.

8. The printer of claim 1, wherein, the determination configuration uses a pre-set image pattern to assign a kind to the image data presented for storage.

9. A method for managing and printing images for different kinds of image data, comprising the steps of:
- receiving image data presented for storage in an image memory, the image data corresponding to different patients;
- determining if the image data presented for storage corresponds to a patient differing from another patient by detecting a period of signal information in the image data;
- when it is determined that a kind of the image data presented for storage in the image memory is different than that of a last stored image data, causing the printing of all images for the last stored image data and all precedingly stored image data of a same kind as the last stored image data so as to prevent captured images of a plurality of the patients to be printed on one recording sheet, and
- when it is determined that the kind of the image data presented for storage in the image memory is not different than that of the last stored image data, causing the image data presented for storage to be stored in the image memory.

10. The method of claim 9, comprising the further step of, when it is determined that the kind of the image data presented for storage in the image memory is not different than that of the last stored image data, and that the storage of the image data presented for storage will exceed a predetermined number of associated images, causing (a) the printing of all images for the last stored image data and all precedingly and successively stored image data of the same kind as the last stored image data on a sheet of recording paper, (b) the clearance from the image memory the image data for the printed images, and (c) causing the storage of the image data presented for storage.

11. The method of claim 9, wherein the step of determining the kind of the image data presented for storage in the image memory comprises determining a source of the image data.

12. The method of claim 9, wherein the step of determining the kind of the image data presented for storage in the image memory comprises determining the period of the signal information comprising a synchronous signal of a video apparatus generating the image data presented for storage.

13. The method of claim 9, further comprising the step of causing the display of the printed images on a display screen of a display device.

14. The method of claim 9, wherein the step of determining the kind of the image data presented for storage in the image memory comprises comparing the image data to a pre-set image pattern.

* * * * *